United States Patent [19]
Yaindl

[11] Patent Number: 4,486,005
[45] Date of Patent: Dec. 4, 1984

[54] SIDE ROD TENSIONING DEVICE FOR PREVENTING MISALIGNMENT AND DISTORTION DURING ASSEMBLY OF THE PLUNGER DRIVE MECHANISM IN A RECIPROCATING PUMP

[75] Inventor: Charles Yaindl, Harrison, N.J.

[73] Assignee: McGraw-Edison Company, Rolling Meadows, Ill.

[21] Appl. No.: 589,860

[22] Filed: Mar. 16, 1984

Related U.S. Application Data

[63] Continuation of Ser. No. 283,453, Jul. 15, 1981, abandoned.

[51] Int. Cl.³ .............................................. E21B 19/00
[52] U.S. Cl. .................................................. 254/29 A
[58] Field of Search .................... 81/57.38; 254/29 A; 29/452

[56] References Cited

U.S. PATENT DOCUMENTS

| | | | |
|---|---|---|---|
| 3,287,999 | 11/1966 | Kreckel et al. | 254/29 A |
| 3,338,552 | 8/1968 | Persicke | 254/29 A |
| 3,362,682 | 1/1968 | Meschonat et al. | 254/29 A |
| 4,268,011 | 5/1981 | Randall | 254/29 A |

Primary Examiner—Robert C. Watson
Attorney, Agent, or Firm—Jon Carl Gealow; James A. Gabala; Charles W. MacKinnon

[57] ABSTRACT

A tensioning device for prestressing the rod members and transverse members connected thereto and operatively associated therewith has a jack assembly connected between at least two rod members and disposed to engage the transverse member, the jack assembly includes an expansion member such as a piston which can exert tensile forces incrementally on the rod members and the transverse member to evenly stress the same to a predetermined level. The tensioning device may have a pressure plate between the jack assembly and the transverse member to exert a more uniform pressure along the entire transverse member.

1 Claim, 5 Drawing Figures

SIDE ROD TENSIONING DEVICE FOR PREVENTING MISALIGNMENT AND DISTORTION DURING ASSEMBLY OF THE PLUNGER DRIVE MECHANISM IN A RECIPROCATING PUMP

This application is a continuation of Ser. No. 283,453 filed July 15, 1981 now abandoned.

The present invention relates generally to reciprocating pumps and, more particular to a side rod tensioning device for fastening the outside crosshead to the side rods on a reciprocating pump without inducing twist into the outside crosshead during such assembly.

In an inverted plunger type reciprocating pump both vertical and horizontal, having outside packed plungers reciprocated by side rods a serious maintenance problem occurs when the nuts securing the outside or upper crosshead to the side rods are tightened in that a twisting moment is induced about the nut center which causes the outside crosshead to bend one or the other of the side rods from its normal position. This problem is caused by the frictional drag that takes place when the inner face of the nut mates with the outside crosshead.

When this occurs then on operation of the reciprocating pump the load caused by the pressure of the fluid being pumped during the discharge stroke will tend to straighten out the bent side rod. This in turn will place a side load on the plunger and cause friction in the stuffing box. As a result there will be excessive wear on the plungers and the associated packing and bushings of the outside packed plungers in such reciprocating pumps which will eventually require replacement or repair of these parts.

Further, the angular displacement of the outside crosshead will decrease the running clearance in the telescope system which will cause parts to rub together producing wear and causing metal particles to fall down into the crank case where they can damage the bearings and seals on the complex drive for such inverted plunger type reciprocating pumps.

One prior art method for overcoming this problem has been to use large, cumbersome, and expensive torque wrenches for tightening the nuts while holding the outside crosshead in position with another wrench. However, these devices, at best, merely lessen the angular displacement of the outside crosshead. In the case of large, vertical pumps, the use of such wrenches becomes difficult because the outside crosshead is too high to reach without some form of scaffold. Since, such a system is not accurate some twist will still remain in the outside crosshead, even with the use of these devices.

The present invention seeks to overcome this problem by providing a detachably connectible hydraulically actuated tensioning device for exerting tensile forces evenly on the respective side rods to stress the same to a predetermined level outside without transmitting torsional forces or twist to the associated crosshead and to permit the connecting nuts to be evenly tightened so that when the hydraulically actuated tension device is removed, no twist will be induced in the outside crosshead connected to the respective side rods. The force distribution between the two side rods will be equalized so that the side rods are loaded very accurately to the desired stress level, thus guaranteeing zero failure on the side rods due to fatigue.

SUMMARY OF THE INVENTION

Thus, the present invention covers an improved tensioning device for evenly prestressing at least two rod like members, such as drive rods, operatively connected to a transverse member, such as an outside crosshead, by threaded take-up members which includes, an extension section on each of the respective rod like members outboard of the associated transverse member, a jack assembly disposed to be mounted on said extension sections, and a pressure plate disposed between the jack assembly and the transverse member, said jack assembly having an expansion means movable to separate the jack assembly and the pressure plate, and means for actuating the expansion assembly to exert incremental forces on the transverse member and simultaneously to exert corresponding tensile forces on the side members to stress the same to predetermined stress levels whereby the threaded take-up members can be tightened without inducing twist in the transverse member.

The tensioning device as above described wherein the expansion assembly includes, hydraulic cylinder means, piston means in said hydraulic cylinder means, and hydraulic pump means for exerting force on the piston means through the hydraulic fluid in said hydraulic cylinder.

Accordingly, it is an object of the present invention to facilitate accurate tensioning of the side rods of an outside packed plunger reciprocating pump to stress the same to a predetermined level without inducing twist in the associated outside crosshead.

It is another object of the present invention to provide a tensioning device which can provide equalized force distribution on at least two rod members.

It is another object of the present invention to provide a tension device to facilitate tensioning of at least two side rods in an outside packed plunger type reciprocating pump to predetermined stress levels which eliminates the use of large awkward torque wrenches and which provides equalized distributions of forces between the side rods and the outside cross heads thereon and the threaded connections for holding the outside crosshead in assembled position on the side rods.

With these and other objects in view, the invention will be better understood by referring to the following description taken in conjunction with the attached drawings in which:

DESCRIPTION OF THE INVENTION

Figure 1:
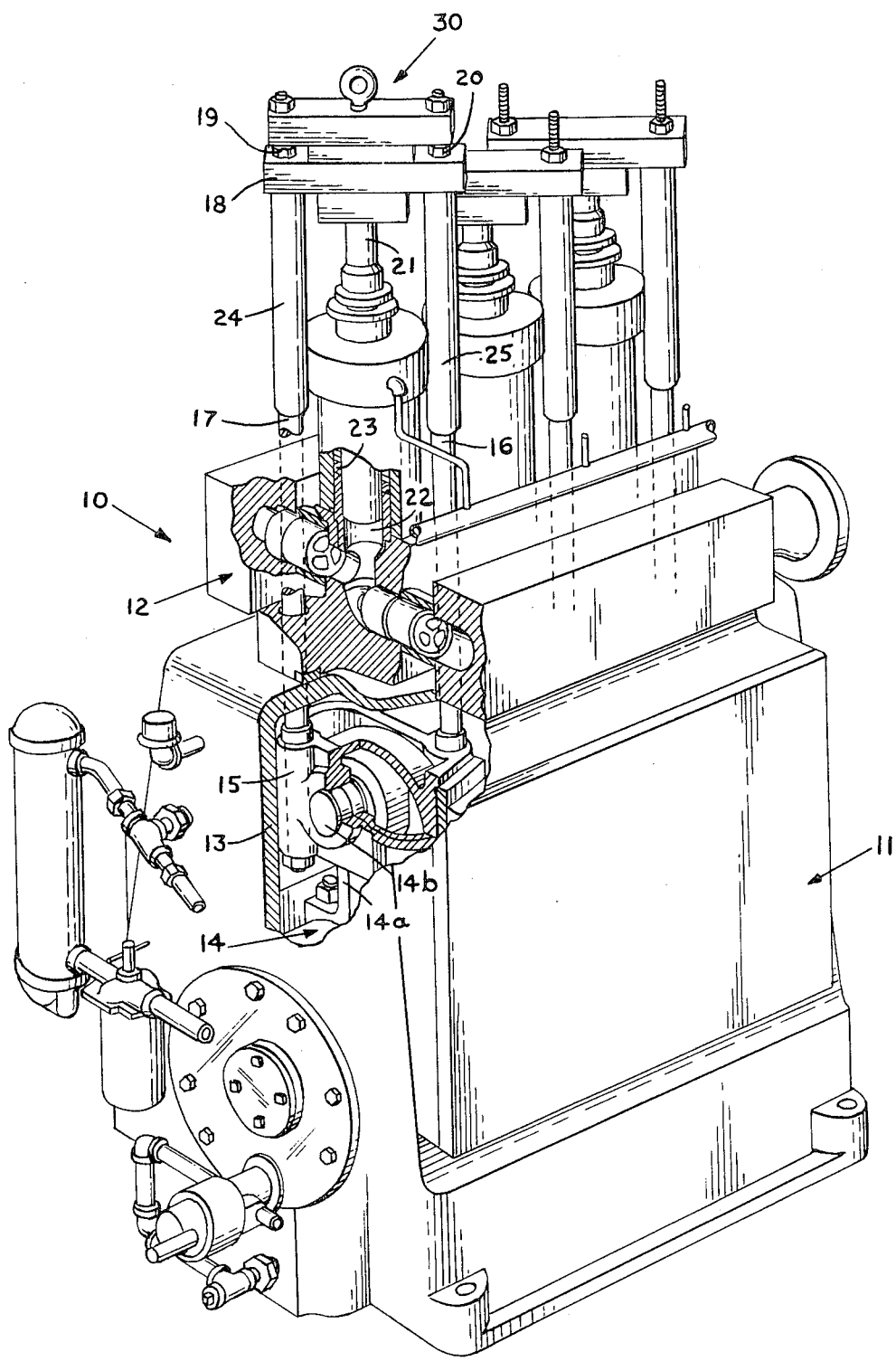
FIG. 1 is a isometric view of an outside packed plunger type reciprocating pump partly broken away to show the operative relation between one set of side rods for one of the outside packed plungers thereon.
Figure 2:
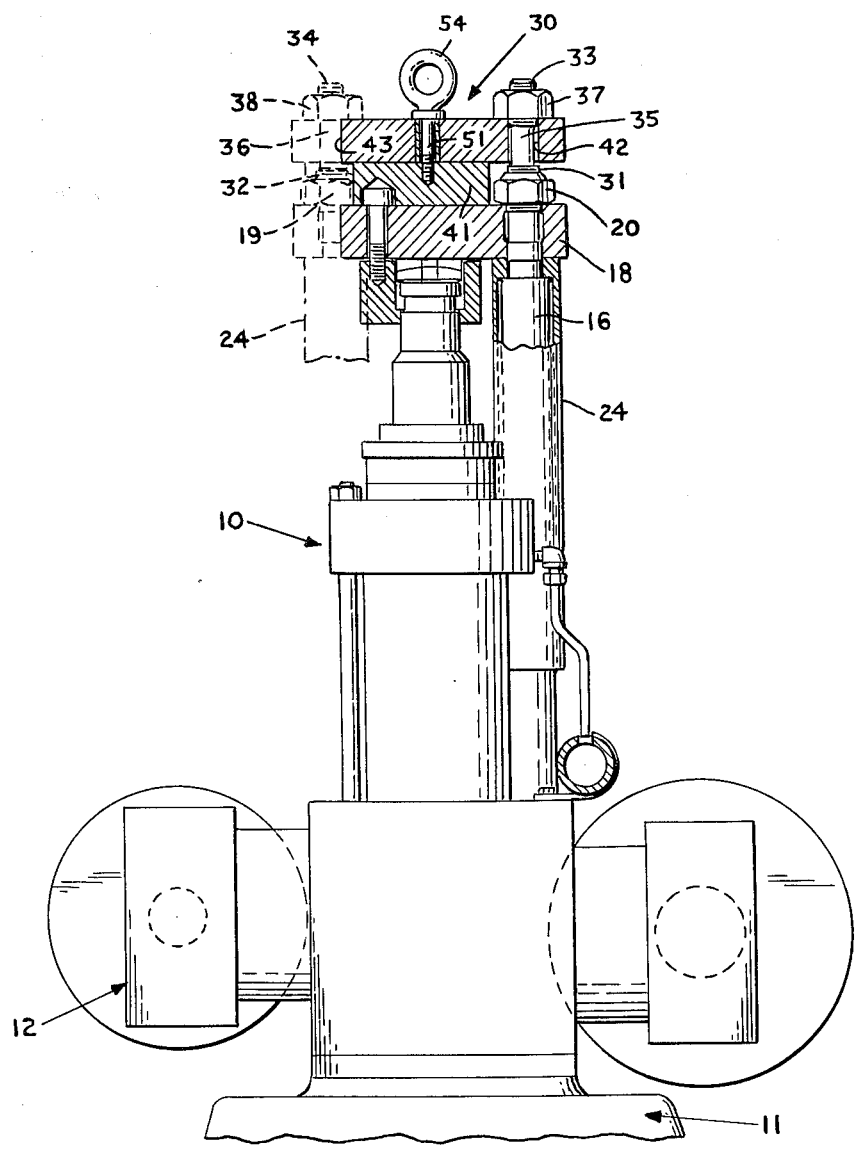
FIG. 2 is an end elevational view of the outside packed plunger type reciprocating pump shown in FIG. 1 showing the upper end of the side rod and outside crosshead in end elevation and vertical cross-section with the associated plunger, and showing a side rod tensioning device in accordance with the present invention mounted thereon also in cross-section.

Referring to the drawings, FIGS. 1 and 2 show an outside packed plunger type, vertically disposed triplex reciprocating pump generally designated 10 which includes a power end 11 and a liquid end 12.

The power end includes a crank case 13 and a driven crank shaft 14 is rotatably mounted therein. The crank shaft 14 is connected by connecting rod 14a and crosshead pin 14b to a lower crosshead 15. Spaced side rods 16 and 17 are connected at one end to the crosshead 15 and extend from the power end to the exterior of the pump through the liquid end 12 where the ends remote from the inside or lower crosshead 15 are connected to an upper or outside crosshead 18 by suitable threaded nuts or take-up members 19 and 20.

In outside packed or inverted plunger pumps of the type herein illustrated, the plunger 21 is connected to the outside or upper crosshead 18 which is slidably disposed in the cylinder 22 which has suitable packing as at 23 to seal the cylinder from leakage as tightly as possible.

In operation, when the crank shaft 14 is rotated by any suitable means not shown, it causes the crosshead 15 to rise and fall, which movement is transmitted through the side rods 16 and 17 and the crosshead 18 to the plunger 21 so as to reciprocate the same in the cylinder 22. Those skilled in the art will readily recognize that the construction described above and its operation is well known in the art and is therefore not more fully described herein because it does not form part of the present invention.

In order to protect the power end from contamination the side rods 16 and 17 have a protective covering 24 and 25, respectively, at the upper ends thereof.

Reciprocating pumps of the type above described operate at pressures up to 40,000 PSIG with capacities to 3,000 GPM. At the pressures and capacities at which these reciprocating pumps operate, it is important that all of the elements be properly aligned or else failures will result which will either render the pumps inoperable or require pump repairs in order to keep the same in operation. This is particularly the case with respect to the alignment of the side rods during the assembly of the outside crossheads thereon for the reasons as stated above.

In order to ensure proper alignment of the side rods with the outside or upper crosshead, so as to avoid inducing twist in the outside or upper crosshead when the connecting or take-up nuts 19 and 20 are tightened during assembly, one form of tensioning device generally designated 30 in accordance with the present invention, is illustrated and will now be described.

TENSIONING DEVICE

The tensioning device 30 is detachably connectible respectively to a given pair of side rods for engagement with the exterior or outboard face of the associated outside or upper crosshead 18 for the respective pair of side rods by a suitable modification of the side rods 16 and 17.

Thus referring to FIGS. 1 and 2 of the drawings, the side rods 16 and 17 are shown as having first threaded means 31 and 32 a predetermined spaced distance from the respective ends thereof and second threaded means 33 and 34 at the respective ends thereof so that the outside or upper crosshead 18 can be mounted transversely on the respective side rods and the threaded connector members or nuts 19 and 20 can be threaded onto the respective first threaded sections 31 and 32 to loosely position the outside or upper crosshead 18 in assembled position. The extension sections 35 and 36 permit the tensioning device 30 to be held also transversely of the side rods in juxtaposition to the exterior or outboard face of the outside or upper crosshead by a second set of threaded connectors or nuts 37 and 38 which respectively engage the second threaded sections 33 and 34 on the end of the extended sections 35 and 36 of the side rods 16 and 17 as is clearly shown in FIGS. 1, 2 and 4 of the drawings.

Tensioning device 30 has a jacking assembly 40 and a pressure plate 41. The jacking assembly is provided with suitable spaced transverse openings or bores 42 and 43 to permit the tensioning device to be mounted on the extension sections 35 and 36 on the side rods 16 and 17 so that the pressure plate 41 is disposed between the jacking assembly 40 and the outboard or upper face of the outside crosshead 18.

The jacking assembly 40 and pressure plate 41 will be made of suitable alloy steel to carry the loads induced by the hydraulic pressure.

An aligning pin as at 44 is fixedly connected to the pressure plate 41 and engages an aligning bore 45 on the jacking assembly 40 so as to permit the jacking assembly 40 to be separated from the pressure plate 14 without losing the alignment of these parts during the operation of the tensioning device.

Further a lost motion fastener generally designated 46 is also provided for fastening the jacking assembly to the pressure plate to retain integrity of the tensioning device when it is connected or removed from the assembled position on the extension sections 35 and 36 of the side rod and at the same time to permit separation of the jacking assembly 40 from the pressure plate 41 during the operation of the tensioning device as is hereinafter described.

The lost motion fastener 46 includes an elongated hollow sleeve 47 which is connected or mounted in a counter-bore 48 in the pressure plate about the threaded bore 49 therein and the elongated sleeve 47 extends through the aligned bore 50 to the exterior or outboard side of the jacking assembly 40. An elongated threaded combined connecting and lifting pin 51 is disposed to extend through the sleeve 50 so that the threaded end 52 thereon is threadibly connected into the threaded bore 49 in the pressure plate 41 and an annular shoulder 53 adjacent the exterior end of the jacking assembly 40 holds the sleeve 50 in assembled position and also prevents the jacking assembly 40 from separating from the aligned position which it holds with the pressure plate by reason of the aligning pin 44 as above described. A lifting eye 54 is provided at the exterior end of the lifting and connecting pin 51 to enable the tensioning device 30 to be connected and detached from the extension sections 35 and 36 on the side rods 16 and 17 as may be required during the use thereof.

Figure 4:
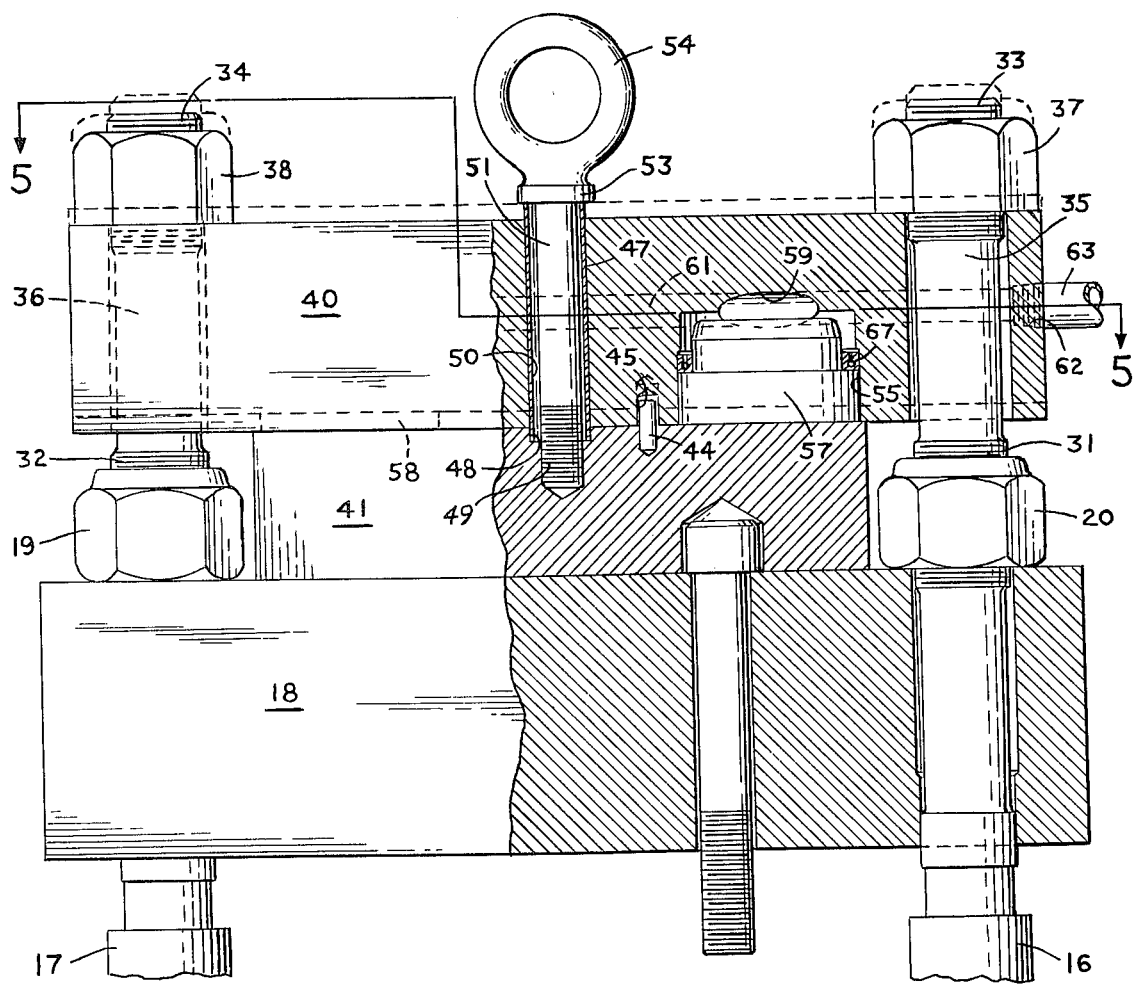
FIG. 4 is an enlarged, side elevational view of the tensioning device affixed to the outside crosshead of the reciprocating pump shown in FIG. 1 partly broken away in vertical section.

All of which is shown in FIGS. 1, 2 and 4 of the drawings.

Figure 3:
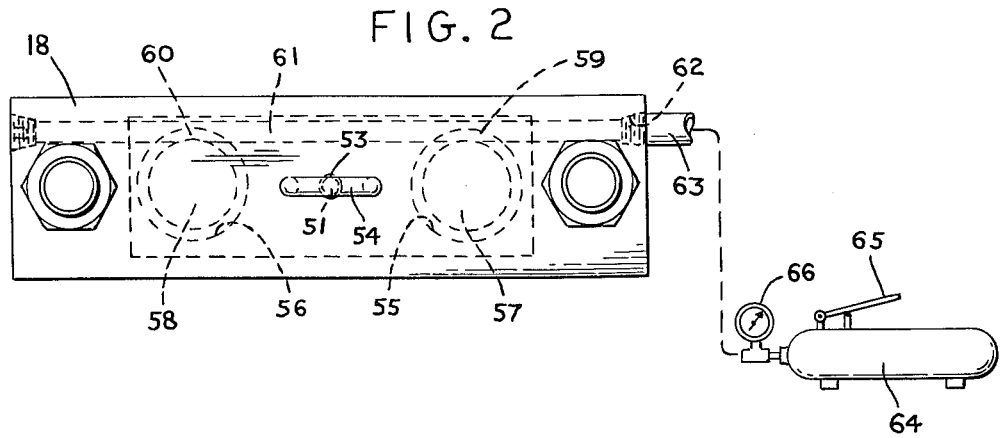
FIG. 3 is a top, plan view of the side rod tensioning device shown in FIG. 2 with the hydraulically operated means connected thereto as shown diagrammatically.
Figure 5:
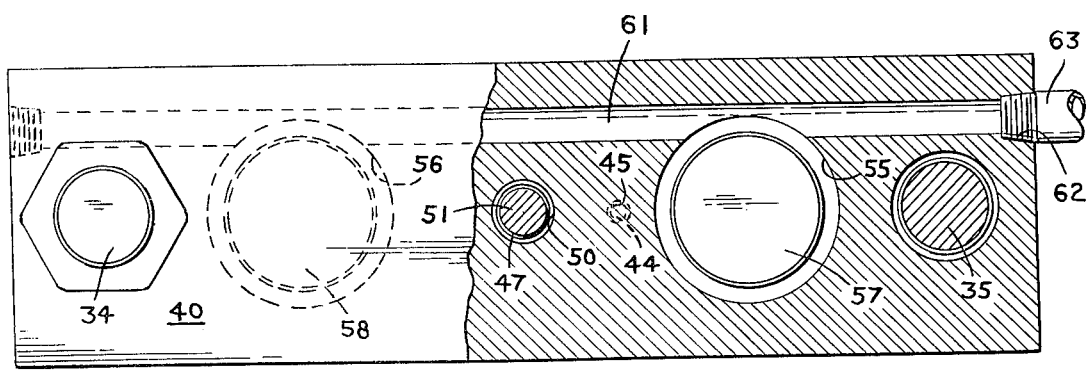
FIG. 5 is an enlarged top, plan view partly in horizontal section taken on line 5—5 of FIG. 4.

FIGS. 3, 4 and 5 further show that the jacking assembly is provided with at least two spaced cylinders as at 55 and 56 in which are respectively mounted piston members 57 and 58. The cylinders 55 and 56 communicate through openings as at 59 and 60 with a common hydraulic fluid manifold 61 having a port 62 which is connected and communicates with a hydraulic fluid delivery line 63 connected at the remote end to a hydraulic fluid pump 64 so that when the pumping handle 65 is operated hydraulic fluid is delivered from the hydraulic pumping mechanism 64 through line 63, port 62 and common manifold 61 to the openings 59 and 60 into the cylinders 55 and 56 for actuating the pistons 57 and 58. A gauge as at 66 is provided to determine the pressure being exerted through the hydraulic fluid on the pistons 57 and 58.

The pistons are provided with suitable seals as at 67 to seal the pistons so that uniform force can be exerted against the piston 57 and 58 during operation of the tensioning device.

OPERATION

In operation the tensioning device is lifted by the lifting ring 54 and aligned with and connected about the extension section 35 and 36 on the side rods 16 and 17 until the lower or inner face of the pressure plate 41 rests on the outboard or upper face of the outside or upper crosshead 18. The nuts 19 and 20 must not be tightened and the nuts 37 and 38 are connected on the end threads 33 and 34 and hand tightened to bring the tensioning device 30 into intimate contact with the outboard or upper face of the outside or upper crosshead 18.

Handle 65 is then pumped and hydraulic pressure is exerted through the hydraulic fluid on the pistons 57 and 58 until the pressure shown on pressure gauge 66 has reached the predetermined desired pressure to exert the required tensile forces on the side rod 16 and 17.

This will cause the jacking assembly 40 and the pressure plate 41 to separate from each other as is illustrated by the dotted line in FIG. 4 of the drawings.

The connecting nuts 19 and 20 can now be tightened with a simple hand wrench until they are snug without inducing any tortional forces or twist into the crosshead 18.

The hydraulic fluid is now released, the threaded nuts 37 and 38 removed and by means of the lifting eye 54, the tensioning device 30 can be removed from the extension sections 35 and 36 on the side rods.

Since the hydraulic fluid is uniformly applied in the respective cylinders 55 and 56 those skilled in the art will readily recognize that the tensile forces will have been uniformly applied to the side rods 16 and 17.

Thus a relatively simple device is provided for prestressing the side rod and the associated outside crosshead 18 to the desired level for connecting these members to each other for proper operation for the inverted plunger 21 on the reciprocating pump 10.

It will be understood that the invention is not to be limited to the specific construction or arrangement of parts shown but that they may be widely modified within the invention defined by the claims.

I claim:

1. A tensioning device for evenly prestressing at least two spaced side rods in a reciprocating machine and a transverse member such as an outside crosshead connected thereto by threaded take-up means, comprising:

an extension section formed on each of said side rods outboard of the threaded take-up means;

a jack assembly positionable between said side rods having spaced means to permit the jack assembly to slide over the respective extension means so that at least one face thereof is connected with the outboard face of the transverse member;

means for holding the jack assembly in assembled position on the respective extension means of the side rods;

a pressure plate disposed between the jack assembly and the outboard face of the transverse member extending substantially the entire distance between the side rods;

expansible means on the jack assembly including at least two hydraulic cylinders laterally aligned with the side rods, each of said cylinders having a movable piston mounted within it adapted to extend out of said one face in contact with the pressure plate in lateral alignment with the side rods;

hydraulic pump means connected with said cylinders for pressurizing the cylinders with hydraulic fluid to actuate uniform movement of said pistons within the cylinders;

gauge means on said hydraulic pump means to determine the pressure being exerted by the hydraulic fluid; and said pistons being adapted to exert a predetermined force on the pressure plate which distributes an essentially uniform load across the breadth of the transverse member between the side rods in a fashion tensioning the rods to stress the same to preselected levels while minimizing the development of unbalanced loads on the rods due to deformation of the jack assembly, thereby enabling a workman to tighten the threaded take-up means before the jack assembly is removed without inducing twist in the transverse member.

* * * * *